US012203053B2

(12) United States Patent
Pulukkody et al.

(10) Patent No.: US 12,203,053 B2
(45) Date of Patent: *Jan. 21, 2025

(54) FABRIC CARE COMPOSITION

(71) Applicants: Rohm and Haas Company, Collegeville, PA (US); Union Carbide Corporation, Seadrift, TX (US)

(72) Inventors: Randara Pulukkody, Landsdale, PA (US); Emmett M. Partain, III, Bound Brook, NJ (US); Lyndsay M. Leal, Spring City, PA (US); Jennifer P. Todd, Willow Grove, PA (US); Michael B. Clark, Jr., Coopersburg, PA (US); Nikhil J. Fernandes, Philadelphia, PA (US)

(73) Assignees: Rohm and Haas Company, Collegeville, PA (US); Union Carbide Corporation, Seadrift, TX (US)

( * ) Notice: Subject to any disclaimer, the term of this patent is extended or adjusted under 35 U.S.C. 154(b) by 174 days.

This patent is subject to a terminal disclaimer.

(21) Appl. No.: 17/796,029

(22) PCT Filed: Mar. 17, 2021

(86) PCT No.: PCT/US2021/022654

§ 371 (c)(1),
(2) Date: Jul. 28, 2022

(87) PCT Pub. No.: WO2021/194808

PCT Pub. Date: Sep. 30, 2021

(65) Prior Publication Data

US 2023/0100700 A1 Mar. 30, 2023

Related U.S. Application Data

(60) Provisional application No. 62/993,769, filed on Mar. 24, 2020.

(51) Int. Cl.

*C11D 3/00* (2006.01)
*C11D 1/831* (2006.01)
*C11D 3/22* (2006.01)
*C11D 3/37* (2006.01)

(52) U.S. Cl.

CPC ............ *C11D 3/0015* (2013.01); *C11D 1/831* (2013.01); *C11D 3/227* (2013.01); *C11D 3/373* (2013.01)

(58) Field of Classification Search

CPC ....... C11D 3/0015; C11D 3/227; C11D 3/373; C11D 1/831

See application file for complete search history.

(56) References Cited

U.S. PATENT DOCUMENTS

| | | | | |
|---|---|---|---|---|
| 4,411,891 | A | 10/1983 | Mizutani et al. | |
| 7,012,053 | B1 | 3/2006 | Barnabas et al. | |
| 7,528,101 | B2 | 5/2009 | Carvell et al. | |
| 7,589,051 | B2 | 9/2009 | Erazo-Majewicz et al. | |
| 2015/0232785 | A1 | 8/2015 | Paullin et al. | |
| 2017/0335242 | A1* | 11/2017 | Eldredge | C07C 211/63 |
| 2018/0237816 | A1* | 8/2018 | Paullin | C08B 37/0021 |
| 2018/0312781 | A1* | 11/2018 | DiCosimo | C08B 37/0009 |
| 2021/0324303 | A1* | 10/2021 | Partain, III | C11D 3/0036 |
| 2021/0348085 | A1* | 11/2021 | Partain, III | C11D 1/83 |
| 2023/0100700 | A1* | 3/2023 | Pulukkody | C11D 3/0036 510/329 |

FOREIGN PATENT DOCUMENTS

| | | | | |
|---|---|---|---|---|
| CN | 104781381 | | 7/2015 | |
| EP | 2922936 | A1 | 9/2015 | |
| WO | WO-0024856 | A1 * | 5/2000 | C11D 17/041 |
| WO | WO-2016160738 | A2 * | 10/2016 | C08B 37/0012 |
| WO | 2017083228 | A1 | 5/2017 | |

OTHER PUBLICATIONS

Cumpstey, Chemical Modification of Polysaccharides, ISRN Organic Chemistry, 2013, vol. 2013, p. 27.

* cited by examiner

*Primary Examiner* — Peter F Godenschwager
*Assistant Examiner* — M. Reza Asdjodi
(74) *Attorney, Agent, or Firm* — Thomas S. Deibert

(57) ABSTRACT

A fabric care composition is provided including water; a cleaning surfactant; a fabric softening silicone; and a deposition aid polymer, wherein the deposition aid polymer is a dextran polymer functionalized with quaternary ammonium moieties; wherein the deposition aid polymer enhances deposition of the fabric softening silicone from the fabric care composition onto a fabric.

14 Claims, No Drawings

FABRIC CARE COMPOSITION

The present invention relates to a fabric care composition. In particular, the present invention relates to a fabric care composition including water; a cleaning surfactant; a fabric softening silicone; and a deposition aid polymer, wherein the deposition aid polymer is a dextran polymer functionalized with quaternary ammonium moieties; wherein the deposition aid polymer enhances deposition of the fabric softening silicone from the fabric care composition onto a fabric.

Use of cationic carbohydrate polymers in laundry detergents is known, as in, e.g., U.S. Pat. No. 6,833,347. However, this references does not suggest the use of the modified polymers described herein.

A modified carbohydrate polymer having quaternary ammonium groups has been disclosed for use in fabric care by Eldredge, et al. in U.S. Patent Application Publication No. 20170335242. Eldredge, et al disclose a fabric care composition comprising a modified carbohydrate polymer having quaternary ammonium groups having at least one $C_{8-22}$ alkyl or alkenyl group; wherein the modified carbohydrate polymer has a weight-average molecular weight of at least 500,000; and wherein at least 20 wt % of the quaternary ammonium groups on the at least one modified carbohydrate polymer have at least one $C_{8-22}$ alkyl or alkenyl group.

Notwithstanding, there remains a continuing need for fabric care compositions having a desirable balance of performance properties, particularly softening and anti-redeposition.

The present invention provides a fabric care composition comprising: water; a cleaning surfactant; a fabric softening silicone; and a deposition aid polymer, wherein the deposition aid polymer is a dextran polymer functionalized with quaternary ammonium moieties; wherein the deposition aid polymer enhances deposition of the fabric softening silicone from the fabric care composition onto a fabric.

The present invention provides a method of treating an article of laundry, comprising: providing an article of laundry; selecting a fabric care composition according to the present invention; providing a bath water; and applying the bath water and the fabric care composition to the article of laundry to provide a treated article of laundry; wherein the fabric softening silicone is associated with the treated article of laundry.

DETAILED DESCRIPTION

It has been found that a fabric care composition including a fabric softening silicone in combination with a deposition aid polymer comprising a dextran polymer functionalized with quaternary ammonium moieties provides a surprisingly favorable balance of softening and anti-redeposition.

Unless otherwise indicated, ratios, percentages, parts, and the like are by weight. Weight percentages (or wt %) in the composition are percentages of dry weight, i.e., excluding any water that may be present in the composition.

As used herein, unless otherwise indicated, the terms "weight average molecular weight" and "Mw" are used interchangeably to refer to the weight average molecular weight as measured in a conventional manner with gel permeation chromatography (GPC) and conventional standards, such as polyethylene glycol standards. GPC techniques are discussed in detail in Modem Size Exclusion Chromatography, W. W. Yau, J. J. Kirkland, D. D. Bly; Wiley-lnterscience, 1979, and in A Guide to Materials Characterization and Chemical Analysis, J. P. Sibilia; VCH, 1988, p. 81-84. Weight average molecular weights are reported herein in units of Daltons.

Preferably, the fabric care composition of the present invention, comprises: water (preferably, 10 to 94.9 wt % (more preferably, 25 to 94 wt %; still more preferably, 40 to 85 wt %; most preferably, 50 to 75 wt %), based on the weight of the fabric care composition, of water); a cleaning surfactant (preferably, 5 to 89.9 wt % (more preferably, 7.5 to 75 wt %; still more preferably, 10 to 60 wt %; most preferably, 15 to 30 wt %), based on the weight of the fabric care composition, of the cleaning surfactant); a fabric softening silicone (preferably, 0.05 to 10 wt % (more preferably, 0.1 to 5 wt %; most preferably, 0.1 to 3 wt %), based on the weight of the fabric care composition, of the fabric softening silicone)(preferably, wherein the fabric softening silicone is selected from the group consisting of a nitrogen free silicone polymer, an anionic silicone polymer and mixtures thereof); and a deposition aid polymer (preferably, 0.05 to 5.0 wt %; more preferably, 0.075 to 3.0 wt %; still more preferably, 0.09 to 2.5 wt %; most preferably, 0.1 to 2.25 wt %), based on the weight of the fabric care composition, of the deposition aid polymer), wherein the deposition aid polymer is a dextran polymer (preferably, a branched chain dextran polymer) functionalized with quaternary ammonium moieties (preferably, wherein the deposition aid polymer has a Kjeldahl nitrogen content corrected for ash and volatiles, TKN, of ≥0.5 wt % (preferably, 0.5 to 5.0 wt %; more preferably, 0.5 to 4.0 wt %; still more preferably, 0.75 to 2.5 wt %; most preferably, 1 to 2 wt %); wherein the deposition aid polymer enhances deposition of the fabric softening silicone from the fabric care composition onto a fabric (preferably, wherein the fabric is selected from the group consisting of cotton interlock, cotton, poly cotton blend and cotton terry; more preferably, wherein the fabric contains cotton; most preferably, wherein the fabric is cotton).

Preferably, the fabric care composition of the present invention is a liquid formulation. More preferably, the fabric care composition of the present invention is an aqueous liquid formulation.

Preferably, the fabric care composition of the present invention, comprises: water. More preferably, the fabric care composition of the present invention, comprises: 10 to 94.9 wt % (more preferably, 25 to 94 wt %; still more preferably, 40 to 85 wt %; most preferably, 50 to 75 wt %), based on the weight of the fabric care composition, of water. Still more preferable, the fabric care composition of the present invention, comprises: 10 to 94.9 wt % (more preferably, 25 to 94 wt %; still more preferably, 40 to 85 wt %; most preferably, 50 to 75 wt %), based on the weight of the fabric care composition, of water, wherein the water is at least one of distilled water and deionized water. Most preferably, the fabric care composition of the present invention, comprises: 10 to 94.9 wt % (more preferably, 25 to 94 wt %; still more preferably, 40 to 85 wt %; most preferably, 50 to 75 wt %), based on the weight of the fabric care composition, of water, wherein the water is distilled and deionized.

Preferably, the fabric care composition of the present invention, comprises: a cleaning surfactant. More preferably, the fabric care composition of the present invention, comprises: 5 to 89.9 wt % (preferably, 7.5 to 75 wt %; more preferably, 10 to 60 wt %; most preferably, 15 to 30 wt %), based on the weight of the fabric care composition, of a cleaning surfactant. Still more preferably, the fabric care composition of the present invention, comprises: 5 to 89.9 wt % (preferably, 7.5 to 75 wt %; more preferably, 10 to 60 wt %; most preferably, 15 to 30 wt %), based on the weight of the fabric care composition, of a cleaning surfactant;

wherein the cleaning surfactant is selected from the group consisting of anionic surfactants, nonionic surfactants, cationic surfactants, amphoteric surfactants and mixtures thereof. Yet still more preferably, the fabric care composition of the present invention, comprises: 5 to 89.9 wt % (preferably, 7.5 to 75 wt %; more preferably, 10 to 60 wt %; most preferably, 15 to 30 wt %), based on the weight of the fabric care composition, of a cleaning surfactant; wherein the cleaning surfactant is selected from the group consisting of a mixture including an anionic surfactant and a non-ionic surfactant. Most preferably, the fabric care composition of the present invention, comprises: 5 to 89.9 wt % (preferably, 7.5 to 75 wt %; more preferably, 10 to 60 wt %; most preferably, 15 to 30 wt %), based on the weight of the fabric care composition, of a cleaning surfactant; wherein the cleaning surfactant includes a mixture of a linear alkyl benzene sulfonate, a sodium lauryl ethoxysulfate and a nonionic alcohol ethoxylate.

Anionic surfactants include alkyl sulfates, alkyl benzene sulfates, alkyl benzene sulfonic acids, alkyl benzene sulfonates, alkyl polyethoxy sulfates, alkoxylated alcohols, paraffin sulfonic acids, paraffin sulfonates, olefin sulfonic acids, olefin sulfonates, alpha-sulfocarboxylates, esters of alpha-sulfocarboxylates, alkyl glyceryl ether sulfonic acids, alkyl glyceryl ether sulfonates, sulfates of fatty acids, sulfonates of fatty acids, sulfonates of fatty acid esters, alkyl phenols, alkyl phenol polyethoxy ether sulfates, 2-acryloxy-alkane-1-sulfonic acid, 2-acryloxy-alkane-1-sulfonate, beta-alkyloxy alkane sulfonic acid, beta-alkyloxy alkane sulfonate, amine oxides and mixtures thereof. Preferred anionic surfactants include $C_{8-20}$ alkyl benzene sulfates, $C_{8-20}$ alkyl benzene sulfonic acid, $C_{8-20}$ alkyl benzene sulfonate, paraffin sulfonic acid, paraffin sulfonate, alpha-olefin sulfonic acid, alpha-olefin sulfonate, alkoxylated alcohols, $C_{8-20}$ alkyl phenols, amine oxides, sulfonates of fatty acids, sulfonates of fatty acid esters and mixtures thereof. More preferred anionic surfactants include $C_{12-16}$ alkyl benzene sulfonic acid, $C_{12-16}$ alkyl benzene sulfonate, $C_{12-18}$ paraffin-sulfonic acid, $C_{12-18}$ paraffin-sulfonate and mixtures thereof.

Non-ionic surfactants include secondary alcohol ethoxylates, ethoxylated 2-ethylhexanol, ethoxylated seed oils, butanol caped ethoxylated 2-ethylhexanol and mixtures thereof. Preferred non-ionic surfactants include secondary alcohol ethoxylates.

Cationic surfactants include quaternary surface active compounds. Preferred cationic surfactants include quaternary surface active compounds having at least one of an ammonium group, a sulfonium group, a phosphonium group, an iodinium group and an arsonium group. More preferred cationic surfactants include at least one of a dialkyldimethylammonium chloride and alkyl dimethyl benzyl ammonium chloride. Still more preferred cationic surfactants include at least one of $C_{16-18}$ dialkyldimethylammonium chloride, a $C_{8-18}$ alkyl dimethyl benzyl ammonium chloride di-tallow dimethyl ammonium chloride and di-tallow dimethyl ammonium chloride. Most preferred cationic surfactant includes di-tallow dimethyl ammonium chloride.

Amphoteric surfactants include betaines, amine oxides, alkylamidoalkylamines, alkyl-substituted amine oxides, acylated amino acids, derivatives of aliphatic quaternary ammonium compounds and mixtures thereof. Preferred amphoteric surfactants include derivatives of aliphatic quaternary ammonium compounds. More preferred amphoteric surfactants include derivatives of aliphatic quaternary ammonium compounds with a long chain group having 8 to 18 carbon atoms. Still more preferred amphoteric surfactants include at least one of $C_{12-14}$ alkyldimethylamine oxide, 3-(N,N-dimethyl-N-hexadecyl-ammonio)propane-1-sulfonate, 3-(N,N-dimethyl-N-hexadecylammonio)-2-hydroxypropane-1-sulfonate. Most preferred amphoteric surfactants include at least one of $C_{12-14}$ alkyldimethylamine oxide.

Preferably, the fabric care composition of the present invention, comprises: a fabric softening silicone. More preferably, the fabric care composition of the present invention, comprises: 0.05 to 10 wt % (preferably, 0.1 to 5 wt %; more preferably, 0.1 to 3 wt %), based on the weight of the fabric care composition, of a fabric softening silicone. Still more preferably, the fabric care composition of the present invention, comprises: 0.05 to 10 wt % (preferably, 0.1 to 5 wt %; more preferably, 0.1 to 3 wt %), based on the weight of the fabric care composition, of a fabric softening silicone; wherein the fabric softening silicone is selected from the group consisting of a nitrogen free silicone polymer, an anionic silicone polymer and mixtures thereof. Most preferably, the fabric care composition of the present invention, comprises: 0.05 to 10 wt % (preferably, 0.1 to 5 wt %; more preferably, 0.1 to 3 wt %), based on the weight of the fabric care composition, of a fabric softening silicone; wherein the fabric softening silicone is selected from the group consisting of a nitrogen free silicone polymer, an anionic silicone polymer and mixtures thereof; and wherein the fabric softening silicone is in the form of an emulsion.

Preferred nitrogen free silicone polymers include nonionic nitrogen free silicone polymers, zwitterionic nitrogen free silicone polymers, amphoteric nitrogen free silicone polymers and mixtures thereof. Preferred nitrogen free silicone polymers have formula (1), (2) or (3)(preferably, formula (1) or (3)):

(1)

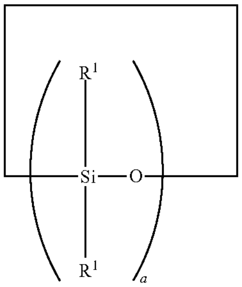

(2)

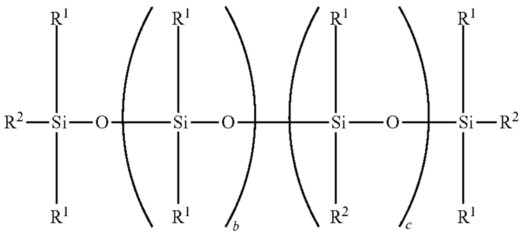

-continued (3)

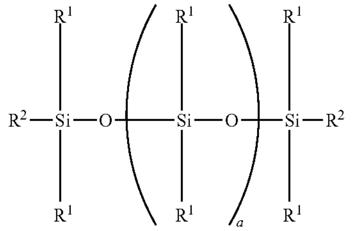

wherein each $R^1$ is independently selected from the group consisting of a $C_{1-20}$ alkyl group, a $C_{2-20}$ alkenyl group, a $C_{6-20}$ aryl group, a $C_{7-20}$ arylalkyl group, a $C_{7-20}$ alkylaryl group, a $C_{7-20}$ arylalkenyl group and a $C_{7-20}$ alkenylaryl group (preferably, wherein $R^1$ is selected from the group consisting of a methyl group, a phenyl group and a phenylalkyl group); wherein each $R^2$ is independently selected from the group consisting of a $C_{1-20}$ alkyl group, a $C_{2-20}$ alkenyl group, a $C_{6-20}$ aryl group, a $C_{7-20}$ arylalkyl group, a $C_{7-20}$ alkylaryl group, a $C_{7-20}$ arylalkenyl group, a $C_{7-20}$ alkenylaryl group and a poly(ethyleneoxide/propyleneoxide) copolymer group having formula (4)

$$—(CH_2)_nO(C_2H_4O)_m(C_3H_6O)_pR^3 \quad (4)$$

wherein each $R^3$ is independently selected from the group consisting of a hydrogen, a $C_{1-4}$ alkyl group and an acetyl group; wherein at least one $R^2$ is a poly(ethyleneoxy/propyleneoxy) copolymer group having formula (4); wherein a has a value such that the viscosity of the nitrogen free silicone polymer according to formula (1) or formula (3) is 2 to 50,000,000 centistokes at 20° C. (preferably, 10,000 to 800,000 centistokes at 20° C.); wherein b is 1 to 50 (preferably, 1 to 30); wherein c is 1 to 50 (preferably, 1 to 30); wherein n is 1 to 50 (preferably, 3 to 5); wherein m is 1 to 100 (preferably, 6 to 100); wherein p is 0 to 14 (preferably, 0 to 3); wherein m+p is 5 to 150 (preferably, 7 to 100) (preferably, wherein $R^2$ is selected from the group consisting of a methyl group, a phenyl group, a phenylalkyl group and from the group having formula (4)). Most preferred nitrogen free silicone polymers have formula (3), wherein $R^1$ is a methyl and wherein a has a value such that the viscosity of the nitrogen free silicone polymer is 60,000 to 700,000 centistokes at 20° C.

Preferred nitrogen free silicone polymers include anionic silicone polymers. Anionic silicone polymers are described, for example, in The Encyclopedia of Polymer Science, volume 11, p. 765. Examples of anionic silicone polymers include silicones that incorporate carboxylic, sulphate, sulphonic, phosphate and/or phosphonate functionality. Preferred anionic silicone polymers incorporated carboxyl functionality (e.g., carboxylic acid or carboxylate anion). Preferred anionic silicone polymers have a weight average molecular weight of 1,000 to 100,000 Daltons (preferably, 2,000 to 50,000 Daltons; more preferably, 5,000 to 50,000 Daltons; most preferably, 10,000 to 50,000 Daltons). Preferably, the anionic silicone polymer has an anionic group content of at least 1 mol % (more preferably, at least 2 mol %). Preferably, the anionic groups on the anionic silicone polymer are not located on the terminal position of the longest linear silicone chain. Preferred anionic silicone polymers have anionic groups at a midchain position on the silicone. More preferred anionic silicone polymers have anionic groups located at least 5 silicone atoms from a terminal position on the longest linear silicone chain in the anionic silicone polymer.

Preferably, the fabric care composition of the present invention comprises a deposition aid polymer; wherein the deposition aid polymer is a dextran polymer functionalized with quaternary ammonium moieties; wherein the deposition aid polymer enhances deposition of silicone from the fabric care composition onto a fabric (preferably, a cotton fabric). More preferably, the fabric care composition of the present invention comprises 0.05 to 5.0 wt % (preferably, 0.075 to 3.0 wt %; more preferably, 0.09 to 2.5 wt %; most preferably, 0.1 to 2.25 wt %), based on the weight of the fabric care composition, of a deposition aid polymer; wherein the deposition aid polymer is a dextran polymer functionalized with quaternary ammonium moieties; wherein the deposition aid polymer enhances deposition of silicone from the fabric care composition onto a fabric (preferably, a cotton fabric). Most preferably, the fabric care composition of the present invention comprises 0.05 to 5.0 wt % (preferably, 0.075 to 3.0 wt %; more preferably, 0.09 to 2.5 wt %; most preferably, 0.1 to 2.25 wt %), based on the weight of the fabric care composition, of a deposition aid polymer; wherein the deposition aid polymer is a dextran polymer functionalized with quaternary ammonium moieties; wherein the deposition aid polymer enhances deposition of silicone from the fabric care composition onto a fabric (preferably, a cotton fabric); wherein the deposition aid polymer has a Kjeldahl nitrogen content corrected for ash and volatiles, TKN, of ≥0.5 wt % (preferably, 0.5 to 5.0 wt %; more preferably, 0.5 to 4.0 wt %; still more preferably, 0.75 to 2.5 wt %; most preferably, 1 to 2 wt %) (measured using a Buchi KjelMaster K-375 automated analyzer, corrected for volatiles and ash measured as described in ASTM method D-2364); wherein the deposition aid polymer enhances deposition of silicone from the fabric care composition onto a fabric (preferably, a cotton fabric).

Preferably, the deposition aid polymer is a dextran polymer functionalized with quaternary ammonium moieties. More preferably, the deposition aid polymer is a dextran polymer functionalized with quaternary ammonium moieties; wherein the dextran polymer is a branched chain dextran polymer. Still more preferably, the deposition aid polymer is a dextran polymer functionalized with quaternary ammonium moieties; wherein the dextran polymer comprises a branched chain dextran polymer; wherein the branched chain dextran polymer comprises a plurality of glucose structural units; wherein 90 to 98 mol % (preferably, 92.5 to 97.5 mol %; more preferably, 93 to 97 mol %; most preferably, 94 to 96 mol %) of the glucose structural units are connected by α-D-1,6 linkages and 2 to 10 mol % (preferably, 2.5 to 7.5 mol %; more preferably, 3 to 7 mol %; most preferably, 4 to 6 mol %) of the glucose structural units are connected by α-1,3 linkages. Most preferably, the deposition aid polymer is a dextran polymer functionalized with quaternary ammonium moieties; wherein the dextran polymer is a branched chain dextran polymer; wherein the branched chain dextran polymer comprises a plurality of glucose structural units; wherein 90 to 98 mol % (preferably, 92.5 to 97.5 mol %; more preferably, 93 to 97 mol %; most preferably, 94 to 96 mol %) of the glucose structural units are connected by α-D-1,6 linkages and 2 to 10 mol % (preferably, 2.5 to 7.5 mol %; more preferably, 3 to 7 mol %; most preferably, 4 to 6 mol %) of the glucose structural units are connected by α-1,3 linkages according to formula (I)

(I)

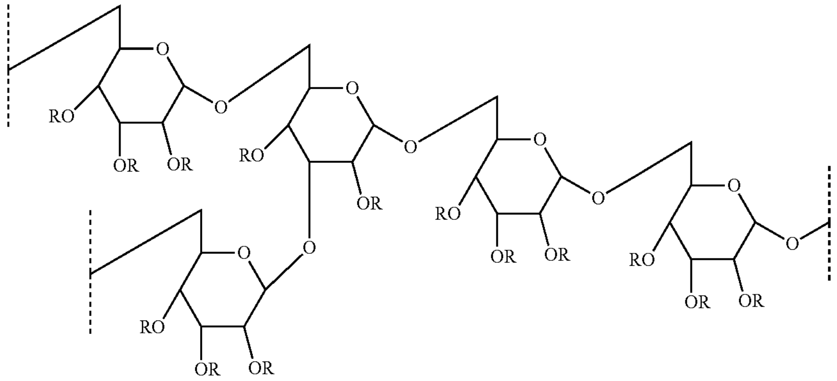

wherein R is selected from a hydrogen, a $C_{1-4}$ alkyl group and a hydroxy $C_{1-4}$ alkyl group; and wherein the average branch off the dextran polymer backbone is $\leq 3$ anhydroglucose units.

Preferably, the dextran polymer contain less than 0.01 wt %, based on weight of the dextran polymer, of alternan. More preferably, the dextran polymer contain less than 0.001 wt %, based on weight of the dextran polymer, of alternan. Most preferably, the dextran polymer contain less than the detectable limit of alternan.

Preferably, the deposition aid polymer is a dextran polymer functionalized with quaternary ammonium moieties. More preferably, the deposition aid polymer is a dextran polymer functionalized with quaternary ammonium moieties; wherein the quaternary ammonium moieties are of formula (A) bound to a pendant oxygen on the dextran polymer

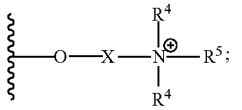

wherein

is a pendant oxygen on the dextran polymer; wherein X is a divalent linking group bonding the quaternary ammonium moiety to the pendent oxygen on the dextran polymer (preferably, wherein X is selected from divalent hydrocarbon groups, which may optionally be substituted (e.g., with a hydroxy group, an alkoxy group, an ether group); more preferably, wherein X is a $-CH_2CH(OR^6)CH_2-$ group; wherein $R^6$ is selected from the group consisting of a hydrogen and a $C_{1-4}$ alkyl group (preferably, a hydrogen); most preferably, X is a $-CH_2CH(OH)CH_2-$ group); wherein each $R^4$ is independently selected from the group consisting of a $C_{1-7}$ alkyl group (preferably, a $C_{1-3}$ alkyl group; more preferably, a methyl group and an ethyl group; most preferably, a methyl group); and wherein $R^5$ is selected from the group consisting of a $C_{1-22}$ alkyl group (preferably, selected from the group consisting of a $C_{1-3}$ alkyl group and a $C_{6-22}$ alkyl group; more preferably, a methyl group and an ethyl group; most preferably, a methyl group). Most preferably, the deposition aid polymer is a cationic dextran polymer; wherein the cationic dextran polymer, comprises a dextran polymer functionalized with quaternary ammonium groups; wherein the quaternary ammonium groups are selected from the group consisting of quaternary ammonium moieties of formula (B) bound to a pendent oxygen on the dextran polymer (B)

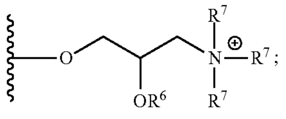

wherein $R^6$ is selected from the group consisting of a hydrogen and a $C_{1-4}$ alkyl group (preferably, a hydrogen); and wherein each $R^7$ is independently selected from the group consisting of a methyl group and an ethyl group (preferably, a methyl group).

Preferably, the deposition aid polymer comprises $<0.001$ meg/gram (preferably, $<0.0001$ meq/gram; more preferably, $<0.00001$ meq/gram; most preferably, $<$detectable limit) of aldehyde functionality.

Preferably, the deposition aid polymer comprises $<0.1\%$ (preferably, $<0.01\%$; more preferably, $<0.001\%$; most preferably, $<$detectable limit), of the linkages between individual glucose units in the deposition aid polymer are β-1,4 linkages.

Preferably, the deposition aid polymer comprises $<0.1\%$ (preferably, $<0.01\%$; more preferably, $<0.001\%$; most preferably, $<$detectable limit), of the linkages between individual glucose units in the deposition aid polymer are β-1,3 linkages.

Preferably, the deposition aid polymer comprises $<0.001$ meq/gram (preferably, $<0.0001$ meq/gram; more preferably, $<0.00001$ meq/gram; most preferably, $<$detectable limit) of silicone containing functionality.

Preferably, the fabric care composition of the present invention is a laundry detergent. Preferably, the laundry detergent optional comprises additives selected from the group consisting of builders (e.g., sodium citrate), hydrotropes (e.g., ethanol, propylene glycol), enzymes (e.g., protease, lipase, amylase), preservatives, perfumes (e.g., essential oils such as D-limonene), fluorescent whitening agents, dyes, additive polymers and mixtures thereof.

Preferably, the fabric care composition of the present invention further comprises: 0 to 10 wt % (preferably, 1 to 10 wt %; more preferably, 2 to 8 wt %; most preferably, 5 to 7.5 wt %), based on the weight of the fabric care composition, of a hydrotrope. More preferably, the fabric care composition of the present invention further comprises: 0 to 10 wt % (preferably, 1 to 10 wt %; more preferably, 2 to 8 wt %; most preferably, 5 to 7.5 wt %), based on the weight of the fabric care composition, of a hydrotrope; wherein the hydrotrope is selected from the group consisting of alkyl hydroxides; glycols, urea; monoethanolamine; diethanolamine; triethanolamine; calcium, sodium, potassium, ammonium and alkanol ammonium salts of xylene sulfonic acid, toluene sulfonic acid, ethylbenzene sulfonic acid and cumene sulfonic acid; salts thereof and mixtures thereof. Still more preferably, the fabric care composition of the present invention further comprises: 0 to 10 wt % (preferably, 1 to 10 wt %; more preferably, 2 to 8 wt %; most preferably, 5 to 7.5 wt %), based on the weight of the fabric care composition, of a hydrotrope; wherein the hydrotrope is selected from the group consisting of ethanol, propylene glycol, sodium toluene sulfonate, potassium toluene sulfonate, sodium xylene sulfonate, ammonium xylene sulfonate, potassium xylene sulfonate, calcium xylene sulfonate, sodium cumene sulfonate, ammonium cumene sulfonate and mixtures thereof. Yet still more preferably, the fabric care composition of the present invention further comprises: 0 to 10 wt % (preferably, 1 to 10 wt %; more preferably, 2 to 8 wt %; most preferably, 5 to 7.5 wt %), based on the weight of the fabric care composition, of a hydrotrope; wherein the hydrotrope includes at least one of ethanol, propylene glycol and sodium xylene sulfonate. Most preferably, the fabric care composition of the present invention further comprises: 0 to 10 wt % (preferably, 1 to 10 wt %; more preferably, 2 to 8 wt %; most preferably, 5 to 7.5 wt %), based on the weight of the fabric care composition, of a hydrotrope; wherein the hydrotrope is a mixture of ethanol, propylene glycol and sodium xylene sulfonate.

Preferably, the fabric care composition of the present invention further comprises: 0 to 10 wt % (preferably, 0.1 to 10 wt %), based on the weight of the fabric care composition, of a fragrance. More preferably, the fabric care composition of the present invention further comprises: 0 to 10 wt % (preferably, 0.1 to 10 wt %), based on the weight of the fabric care composition, of a fragrance; wherein the fragrance includes an essential oil. Most preferably, the fabric care composition of the present invention further comprises: 0 to 10 wt % (preferably, 0.1 to 10 wt %), based on the weight of the fabric care composition, of a fragrance; wherein the fragrance includes esters (e.g., geranyl acetate); terpenes (e.g., geranol, citronellol, linalool, limonene) and aromatic compounds (e.g., vanilla, eugenol).

Preferably, the fabric care composition of the present invention further comprises: 0 to 30 wt % (preferably, 0.1 to 15 wt %; more preferably, 1 to 10 wt %), based on the weight of the fabric care composition, of a builder. More preferably, the fabric care composition of the present invention further comprises: 0 to 30 wt % (preferably, 0.1 to 15 wt %; more preferably, 1 to 10 wt %), based on the weight of the fabric care composition, of a builder; wherein the builder is selected from the group consisting of inorganic builders (e.g., tripolyphosphate, pyrophosphate); alkali metal carbonates; borates; bicarbonates; hydroxides; zeolites; citrates (e.g., sodium citrate); polycarboxylates; monocarboxylates; aminotrismethylenephosphonic acid; salts of aminotrismethylenephosphonic acid; hydroxyethanediphosphonic acid; salts of hydroxyethanediphosphonic acid; diethylenetriaminepenta(methylenephosphonic acid); salts of diethylenetriaminepenta(methylenephosphonic acid); ethylenediaminetetraethylene-phosphonic acid; salts of ethylenediaminetetraethylene-phosphonic acid; oligomeric phosphonates; polymeric phosphonates; mixtures thereof. Most preferably, the fabric care composition of the present invention further comprises: 0 to 30 wt % (preferably, 0.1 to 15 wt %; more preferably, 1 to 10 wt %), based on the weight of the fabric care composition, of a builder; wherein the builder includes a citrate (preferably, a sodium citrate).

Preferably, the fabric care composition is in a liquid form having a pH from 6 to 12.5; preferably at least 6.5, preferably at least 7, preferably at least 7.5; preferably no greater than 12.25, preferably no greater than 12, preferably no greater than 11.5. Suitable bases to adjust the pH of the formulation include mineral bases such as sodium hydroxide (including soda ash) and potassium hydroxide; sodium bicarbonate, sodium silicate, ammonium hydroxide; and organic bases such as mono-, di- or tri-ethanolamine; or 2-dimethylamino-2-methyl-1-propanol (DMAMP). Mixtures of bases may be used. Suitable acids to adjust the pH of the aqueous medium include mineral acid such as hydrochloric acid, phosphorus acid, and sulfuric acid; and organic acids such as acetic acid. Mixtures of acids may be used. The formulation may be adjusted to a higher pH with base and then back titrated to the ranges described above with acid.

The present invention provides a method of treating an article of laundry, comprising: providing an article of laundry; providing a fabric care composition of the present invention; providing a bath water; and applying the bath water and the fabric care composition to the article of laundry to provide a treated article of laundry; wherein the fabric care benefit agent is associated with the treated article of laundry (preferably, wherein the fabric care benefit agent is not covalently bonded to the treated article of laundry). More preferably, the present invention provides a method of treating an article of laundry, comprising: providing an article of laundry; providing a fabric care composition of the present invention; providing a bath water; and applying the bath water and the fabric care composition to the article of laundry to provide a treated article of laundry; wherein the fabric care benefit agent is associated with the treated article of laundry (preferably, wherein the fabric care benefit agent is not covalently bonded to the treated article of laundry) and wherein the deposition aid polymer improves the laundry delivery efficacy of the fabric care benefit agent (preferably, wherein the fabric care benefit agent is a fabric softening silicone).

Some embodiments of the present invention will now be described in detail in the following Examples.

The modified carbohydrate polymers in the Examples were characterized as follows.

The volatiles and ash content (measured as sodium chloride) were determined as described in ASTM method D-2364.

The total Kjeldahl nitrogen content (TKN) was determined in duplicate using a Buchi KjelMaster K-375 automatic Kjeldahl analyzer. The TKN values were corrected for volatiles and ash.

Example S1: Synthesis of Branched Chain Cationic Dextran Polymer

A 500 mL, four necked, round bottom flask fitted with a rubber serum cap, a nitrogen inlet, a pressure equalizing addition funnel, a stirring paddle and motor, a subsurface thermocouple connected to a J-KEM controller and a Friedrich condenser connected to a mineral oil bubbler was charged with dextran (30.33 g; Aldrich product #D4876) and deionized water (160.75 g). The weight average molecular weight of the dextran was 130,000 to 170,000 Daltons. The addition funnel was charged with a 70% aqueous solution of 2,3-epoxypropyltrimethylammonium chloride (27.13 g; QUAB® 151 available from SKW QUAB Chemicals). The flask contents were allowed to stir until the dextran dissolved in the deionized water. While the contents were stirring, the apparatus was purged with nitrogen to displace any oxygen entrained in the system. The nitrogen flow rate was about 1 bubble per second. The mixture was purged with nitrogen while stirring for one hour. Using a plastic syringe, a 25% aqueous sodium hydroxide solution (4.76 g) was added over a period of a few minutes to the flask contents with stirring under nitrogen. The flask contents were then allowed to stir under nitrogen for 30 minutes. The contents of the addition funnel were then charged to the flask contents dropwise over a few minutes under nitrogen with continued stirring. After the contents of the addition funnel were transferred to the flask contents, the mixture was allowed to stir for 5 minutes. Then heat was applied to the flask contents with a heating mantle controlled using the J-KEM controller set at 55° C. The flask contents were heated to and maintained at 55° C. for 90 minutes. The flask contents were then cooled to room temperature while maintaining a positive nitrogen pressure in the flask. When the flask contents reached room temperature, acetic acid (2.50 g) was added dropwise to the flask contents via a syringe and the flask contents were stirred for 5 minutes. The polymer was recovered by non-solvent precipitation of the aqueous solution with an excess of methanol. The precipitated cationic dextran polymer was then recovered by filtration through a Buchner funnel and dried overnight in vacuo at 50° C. The product branched chain cationic dextran polymer was an off-white solid (24.3 g), with a volatiles content of 3.65%, an ash content of 0.37% (as sodium chloride). The volatiles and ash were measured as described in ASTM method D-2364. The Kjeldahl nitrogen content was measured using a Buchi KjelMaster K-375 automated analyzer, and was found to be 1.41% (corrected for volatiles and ash), which corresponds to a trimethylammonium degree of substitution, CS, of 0.19. The weight average molecular weight, Mw, of the product cationic dextran polymer was 1,820,000 Daltons.

Comparative Examples CF1-CF2 and Examples F1-F4: Fabric Care Composition

Fabric care compositions were prepared in each of Comparative Examples CF1-CF2 and Examples F1-F4 having the formulation as described in TABLE 1 and prepared by standard laundry formulation preparation procedure.

TABLE 1

| Ingredient | CF1 | CF2 | F1 | F2 | F3 | F4 |
|---|---|---|---|---|---|---|
| | wt % | | | | | |
| Linear alkyl benzene sulfonate[1] | 8.0 | 8.0 | 8.0 | 8.0 | 8.0 | 8.0 |
| Sodium lauryl ethoxysulfate[2] | 6.0 | 6.0 | 6.0 | 6.0 | 6.0 | 6.0 |
| Propylene glycol | 5.0 | 5.0 | 5.0 | 5.0 | 5.0 | 5.0 |
| Ethanol | 2.0 | 2.0 | 2.0 | 2.0 | 2.0 | 2.0 |
| Nonionic alcohol ethoxylate[3] | 6.0 | 6.0 | 6.0 | 6.0 | 6.0 | 6.0 |
| Sodium citrate | 5.0 | 5.0 | 5.0 | 5.0 | 5.0 | 5.0 |
| Example S1 | — | — | 1.0 | — | — | — |
| Cationic hydroxyethylcellulose[4] | — | 1.0 | — | — | — | — |

TABLE 1-continued

| Ingredient | CF1 | CF2 | F1 | F2 | F3 | F4 |
|---|---|---|---|---|---|---|
| | wt % | | | | | |
| Dextran hydroxypropyltrimonium chloride[5] | — | — | — | 1.0 | — | — |
| Dextran hydroxypropyltrimonium chloride[6] | — | — | — | — | 1.0 | — |
| Dextran hydroxypropyltrimonium chloride[7] | — | — | — | — | — | 1.0 |
| Silicone emulsion[8] | 2.0 | 2.0 | 2.0 | 2.0 | 2.0 | 2.0 |
| NaOH (10% solution) | Adjust pH to 8.0 | | | | | |
| Deionized water | q.s. 100 | | | | | |

[1]Nacconol 90G available from Stepan Company
[2]Steol CS-460 available from Stepan Company
[3]Biosoft N25-7 available from Stepan Company
[4]UCARE ™ LR 400 available from The Dow Chemical Company
[5]CDC-L available from Meito Sangyo Co., Ltd. ($M_w$~10,000)
[6]CDC available from Meito Sangyo Co., Ltd. ($M_w$~40,000)
[7]CDC-H available from Meito Sangyo Co., Ltd. ($M_w$~500,000)
[8]DOWSIL ™ BY 22-840 SR available from The Dow Chemical Company

Silicone In-Wash Deposition

The silicone in wash deposition of the silicone containing fabric care compositions was evaluated for each of the compositions of Comparative Examples CF1-CF2 and Examples F1-F4 on cotton. The cotton was laundered with the silicone containing fabric care compositions in a Terg-O-tometer under typical washing conditions (ambient wash temperatures, water hardness: 200 ppm $Ca^{2+}$:$Mg^{2+}$ of 3:1 mole ratio, one 16 minute wash cycle and one three minute rinse) using a silicone containing fabric care composition dosage of 1.0 g/L of water.

The silicone surface deposition on the cotton was then determined by X-ray photoelectron spectroscopy (XPS). The bulk silicone concentration on the cotton surface was also measured by X-ray fluorescence spectroscopy (XRF). The results are provided in TABLE 2.

The volatiles content and ash content (as sodium chloride) measured as described in ASTM method D-2364 and the Kjeldahl nitrogen content as measured using a Buchi KjelMaster K-375 automated analyzer (corrected for volatiles and ash) and the corresponding calculated trimethylammonium degree of substitution, CS, are also provided in TABLE 2.

TABLE 2

| Formulation Example | Volatiles | Ash | TKN | CS | Deposited Si (wt %) XPS (wt %) | XRF (ppm) |
|---|---|---|---|---|---|---|
| CF1 | — | — | — | — | 0.5 | 34 |
| F1 | 3.65% | 0.37% | 1.41% | 0.19 | 4.0 | 209 |
| F2 | 4.50% | 1.71% | 2.41% | 0.38 | — | 62 |
| F3 | 3.18% | 1.50% | 2.55% | 0.41 | — | 124 |
| F4 | 10.75% | 1.36% | 2.58% | 0.41 | — | 257 |

Soil Anti-Redeposition

The soil anti-redeposition of the fabric care compositions was evaluated for each of the compositions of Comparative Examples CF1-CF2 and Example F1 on four types of fabric (cotton interlock, cotton, polyester/cotton blend, cotton terry) by washing the fabrics in a Terg-O-tometer under typical washing conditions (ambient wash temperature, water hardness: 200 ppm $Ca^{2+}$:$Mg^{2+}$ of 3:1 mole ratio, with a 60 minute wash and a 3 minute rinse, 1 L/wash) using a detergent dosage of 0.5 g/L. An orange (high iron content)

clay slurry (0.63 g Red Art Clay) and dust sebum dispersion (2.5 g) was the added soil load. Once washing was complete, the fabric swatches were dried, and read on a Mach5 color instrument to compute the Whiteness Index (WI) in accordance with ASTM E313. The results are provided in TABLE 3 as delta Whiteness Index (ΔWI E313), with lower values being better.

TABLE 3

| Formulation | Deposition aid | Fabric Type | ΔWI E313 |
|---|---|---|---|
| C1 | — | Cotton Interlock | 20.0 |
| C2 | Cationic hydroxyethylcellulose[1] | Cotton Interlock | 40.6 |
| F1 | Example S1 | Cotton Interlock | 22.5 |
| C1 | — | Cotton | 25.3 |
| C2 | Cationic hydroxyethylcellulose[1] | Cotton | 33.9 |
| F1 | Example S1 | Cotton | 32.7 |
| C1 | — | Poly Cotton | 9.0 |
| C2 | Cationic hydroxyethylcellulose[1] | Poly Cotton | 29.4 |
| F1 | Example S1 | Poly Cotton | 10.6 |
| C1 | — | Cotton Terry | 19.9 |
| C2 | Cationic hydroxyethylcellulose[1] | Cotton Terry | 38.5 |
| F1 | Example S1 | Cotton Terry | 23.2 |

[1]available from The Dow Chemical Company

We claim:

1. A fabric care composition comprising:
water;
a cleaning surfactant;
a fabric softening silicone; and
a deposition aid polymer, wherein the deposition aid polymer is a dextran polymer functionalized with quaternary ammonium moieties; wherein the deposition aid polymer is a branched chain dextran polymer functionalized with quaternary ammonium groups; wherein the branched chain dextran polymer comprises a plurality of glucose structural units; wherein 90 to 98 mol % of the glucose structural units are connected by α-D-1,6 linkages; 2 to 10 mol % of the glucose structural units are connected by α-1,3 linkages and wherein less than 0.1 mol % of the linkages between individual glucose units in the deposition aid polymer are β-1,3 linkages; and
wherein the deposition aid polymer enhances deposition of the fabric softening silicone from the fabric care composition onto a fabric.

2. The fabric care composition of claim 1, wherein the fabric softening silicone is selected from the group consisting of nitrogen free silicone polymers and anionic silicone polymers.

3. The fabric care composition of claim 1, wherein the deposition aid polymer has a Kjeldahl nitrogen content corrected for ash and volatiles of 0.5 to 5.0 wt %.

4. The fabric care composition of claim 3, wherein the fabric care composition is a laundry detergent.

5. The laundry detergent of claim 4, wherein the cleaning surfactant is selected from the group consisting of anionic surfactants, nonionic surfactants, cationic surfactants, amphoteric surfactants and mixtures thereof.

6. The laundry detergent of claim 5, wherein the cleaning surfactant includes a mixture of a linear alkyl benzene sulfonate, a sodium lauryl ethoxysulfate and a nonionic alcohol ethoxylate.

7. The laundry detergent of claim 5, wherein the laundry detergent comprises:
50 to 75 wt %, based on weight of the laundry detergent, of water;
15 to 30 wt %, based on weight of the laundry detergent, of the cleaning surfactant;
0.1 to 3 wt %, based on weight of the laundry detergent, of the fabric softening silicone, wherein the fabric softening silicone is selected from the group consisting of nitrogen free silicone polymers and anionic silicone polymers; and
0.1 to 2.25 wt %, based on weight of the laundry detergent, of the deposition aid polymer.

8. The laundry detergent of claim 7, wherein the deposition aid polymer has a Kjeldahl nitrogen content corrected for ash and volatiles, TKN, of 0.75 to 2.5 wt %.

9. The laundry detergent of claim 8, wherein the deposition aid polymer has a Kjeldahl nitrogen content corrected for ash and volatiles, TKN, of 1 to 2 wt %.

10. A method of treating an article of laundry, comprising: providing an article of laundry; selecting a fabric care composition according to claim 1; providing a bath water; and applying the bath water and the fabric care composition to the article of laundry to provide a treated article of laundry; wherein the fabric softening silicone is associated with the treated article of laundry.

11. The method of claim 10, wherein the fabric care composition is a laundry detergent according to claim 6.

12. The method of claim 10, wherein the fabric care composition is a laundry detergent according to claim 7.

13. The method of claim 10, wherein the fabric care composition is a laundry detergent according to claim 8.

14. The method of claim 10, wherein the fabric care composition is a laundry detergent according to claim 9.

* * * * *